Figure 1:
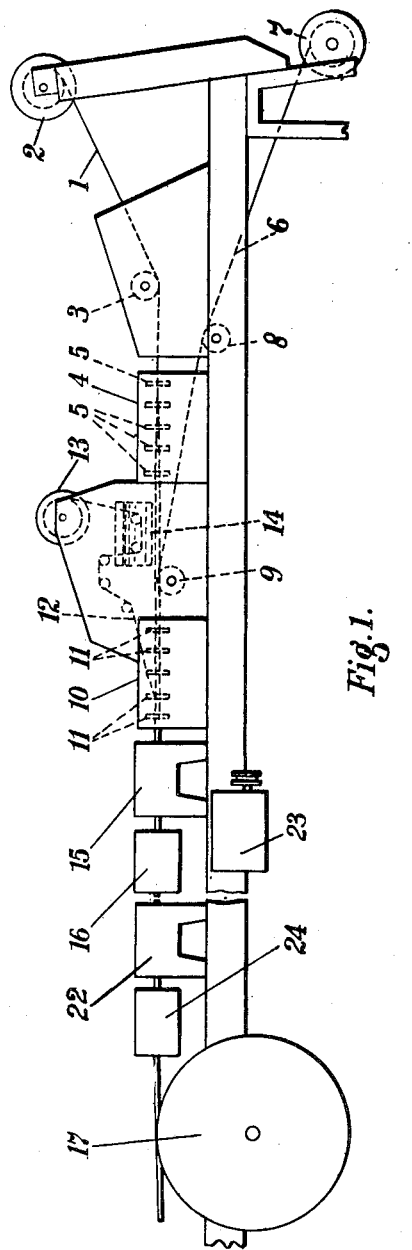

June 12, 1956

H. J. DIXON ET AL 2,749,866

MANUFACTURE OF METAL TUBES APPLICABLE IN
SOME CASES AS ELECTRIC CONDUCTORS OR
OTHER PARTS OF ELECTRIC CABLES

Filed April 2, 1951

2 Sheets-Sheet 1

Inventor
H. J. Dixon
G. H. Webster
By
Webb Mackey + Burden
Attorney

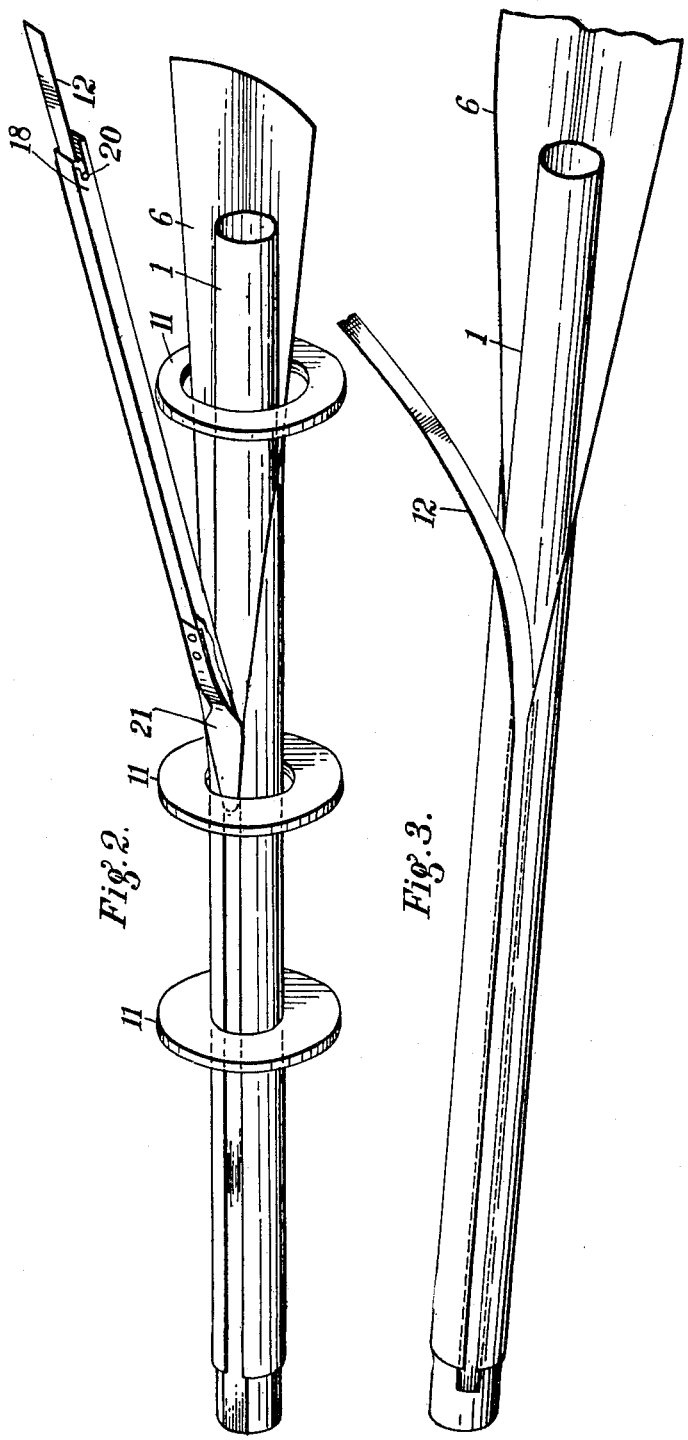

United States Patent Office 2,749,866
Patented June 12, 1956

2,749,866

MANUFACTURE OF METAL TUBES APPLICABLE IN SOME CASES AS ELECTRIC CONDUCTORS OR OTHER PARTS OF ELECTRIC CABLES

Henry Johnson Dixon, West Kirkby, and George Harry Webster, Broadgreen, Liverpool, England, assignors to British Insulated Callender's Cables Limited, London, England, a British company Application April 2, 1951, Serial No. 218,806

Claims priority, application Great Britain April 18, 1950

4 Claims. (Cl. 113—33)

This invention relates to the manufacture of tubes from strips of metal, the tubes being in some cases utilised as the conductors of electric cables or other parts thereof, such as screens or sheaths. The structure of the tube is of the known kind in which one relatively thin strip of metal is bent transversely to a circular form with its edges meeting and is enclosed in another similar strip also bent transversely to a circular form to fit on the inner strip. The one strip is of such dimensions that a small gap is left between the edges so as to ensure that the closing process brings the edges of the other strip into good contact with each other and to ensure that an internal or external diameter of close tolerance is obtained. Alternatively, the edges of the one strip may overlap slightly. The two strips are preferably assembled together so that the edges of the two layers are displaced angularly from each other round the axis of the tube by a substantial amount, preferably 180°.

In the manufacture of such tubes the present invention provides, in a continuous process, for the soldering of the edges of one or both of the strips together and/or to the surface of the adjacent layer. In many cases it will suffice to carry out the soldering at the edges of the outer layer but if required it may be effected at both layers.

In the making of this type of tube the strips are carried forward continuously from supply reels to shaping rollers or dies, one set of which bends the longitudinally advancing inner strip to the circular shape and the other set of which bends the longitudinally advancing outer strip into a similar shape round the inner strip at a later stage in its forward progress. It will be understood that in this transverse bending of the strips the edges of each strip are caused to approach each other gradually.

In the method in accordance with the present invention a thin ribbon of solder is fed between the advancing inner strip and the advancing outer strip as these are being assembled together, the strip being so dimensioned and placed in such a position as to bridge the edges of the outer strip. Then when the bending of the outer strip is complete, heat is applied locally to melt the solder so that it unites the edges of the outer strip at least indirectly to each other, that is to say unites them to each other and/or to the inner strip. This temporary heating is followed by cooling, either natural or artificially increased if required. Where the longitudinal edges of the inner strip are displaced angularly by a substantial angle from those of the outer strip, as is preferred, and it is intended that both sets of edges should be soldered, a second ribbon of solder is fed in between the two advancing strips at a position appropriate for bridging the edges of the inner strip and heat is caused to act on this part of the tube in addition to the heating for the outer edges.

It is to be understood that the term "solder" used herein covers both soft and hard soldering metals and alloys. Suitable metals for the tube are copper, brass, steel and other metals capable of undergoing the necessary bending operations and of being soldered by solder of appropriate composition and capable of being fed to the tube in the form of a ribbon.

Whilst it is not difficult to ensure that under normal running conditions each elemental length of tubing is heated to the correct temperature and for a period of time not longer than necessary for the purpose in view, it is impracticable to ensure this during abnormal conditions, e. g. when stopping and starting. If provision is made to cut off the heating automatically when forward movement of the tube ceases, it is hard to avoid either underheating or over-heating, owing to the difficulty of accurately co-ordinating the rate of reduction of heat applied with the rate of reduction of the speed of travel of the tubing. Both under-heating and over-heating are undesirable. The former is conducive to faulty seaming; the latter may result in damage to the tubing or to heat-susceptible parts contained in it or associated with it. Over-heating of the tubing or of parts associated with it, in the event of a stoppage of the forward movement of the tubing, can be prevented by arranging that the supply of heat to the tubing is automatically cut off or materially reduced when the forward movement of the tubing falls below normal or falls below normal by a predetermined amount. Such an automatic arrangement has, however, the disadvantage that a short length of tubing passes the heating zone without being sufficiently heated for seaming to be effected. Moreover, if, on the one hand, the supply of heat is automatically turned on or materially increased when forward movement of the tubing begins or is resumed, an elemental length of tubing will pass from the heating zone without being heated sufficiently for seaming to be effected. If, on the other hand, heating is commenced or resumed just before forward movement begins or recommences to ensure that the tubing at the exit end of the heating zone is sufficiently heated for seaming to be effected, the following elemental length will be over-heated. A continuous seam throughout a factory length of tubing can be obtained without risk of over-heating if, after a stoppage of the forward movement of the tubing, the tubing is caused to move backwards relative to the heating zone for an appropriate distance before allowing it to resume its forward movement.

In accordance with a further feature of our invention we reduce the risk of a faulty seaming operation on starting up and avoid the need to run back the tubing before recommencing a seaming operation following a stoppage, by disposing a second heating device a short distance in front of the normal heating device, i. e. beyond the normal heating device in the direction of movement of the strips forming the tubing, and arranging for it to be excited or brought into action during the initial stages of movement of the strips. Thus during such stages tubing to be seamed passes through two heating zones in succession, each of which, when the heating zone has reached its normal operating temperature and the tubing is running at normal speed, is capable of locally heating the tubing to the temperature required for the seaming operation and by this we mean capable of heating to the seaming temperature those parts, though not necessarily only those parts, of the tubing which are to be seamed together. These two heating zones, which are each closely followed by a cooling zone, are appropriately spaced apart in the direction of travel of the tubing. The tubing emerging from the first heating zone passes immediately into the first cooling zone where it is cooled, preferably rapidly. On reaching the second heating zone, the cooled tubing is locally re-heated and on leaving this second heating zone is again cooled, preferably rapidly. This double heating of the tubing takes place only whilst the tubing is moving forward and to this end, on starting up, the supply of heat to both heating zones may be effected automatically as the forward movement of the tubing reaches its normal running speed or a speed approximating thereto. Double heating continues for an initial part of each running period after starting up and for an initial part of each running period on re-starting after a stoppage. The supply of heat to the first zone and, in the event of a stoppage occurring during the initial part of the running period, the supply of heat to the second zone as well, are wholly or partly cut off automatically when forward movement falls below normal or falls below normal by a predetermined amount. On re-starting, the supply of heat to both zones is automatically restored as the forward movement of the tubing reaches its normal speed or a speed approximating thereto. Thus on starting up and on re-starting after a stoppage each elemental length leaving the double heating zone will have been raised to the seaming temperature and rapidly cooled, at least once, save perhaps in the most exceptional circumstance of two stoppages occurring in less time than the tube takes to travel from the first to the second head.

To enable the invention to be more fully understood a preferred way of carrying it out will be described by way of example with the aid of the accompanying drawings, wherein, Figure 1 is a diagrammatic elevation of an arrangement for manufacturing solder seamed metal tubing in accordance with the invention, Figure 2 is a diagrammatic perspective view of a part of the arrangement shown in Figure 1 and Figure 3 is a diagrammatic perspective view illustrating a stage in the formation of the tubing.

As will be seen from Figure 1, a metal strip 1 of appropriate width and thickness is drawn off from a supply reel 2 and guided by a pulley 3 towards a transverse bending device 4. The latter comprises a set of apertured metal plates 5 which are spaced apart in the direction of travel of the strip. The apertures in these plates differ in size, the plate with the largest aperture being located at the entry end of the device and the succeeding plates having apertures of progressively decreasing size, the aperture of the final plate having a diameter corresponding to the external diameter of a circular tube formed by the transversely bent strip 1. As the strip 1 advances longitudinally it passes successively through the apertures in the plates 5 and is gradually bent transversely in such a direction as to make its upper surface convex and to change the shape of the strip from flat to circular. A second metal strip 6 of the same width and thickness is drawn off from a second supply reel 7 and guided by pulleys 8 and 9 towards the under side of the transversely bent strip 1 which it meets at a point between the transverse bending device 4 and a second transverse bending device 10 also comprising a number of plates 11 having apertures of progressively decreasing diameters through which pass the transversely bent strip 1 and the strip 6. The bending device 10 gradually bends the longitudinally advancing strip 6 transversely in such a direction as to make its upper surface concave and to change the shape of the strip from flat to circular to enclose or substantially enclose the tube formed by the first bending device 4. During the operation of bending the outer strip 6 to circular form about the inner strip 1 there is fed between the inner and outer strips a thin ribbon of solder metal 12 which is drawn off a supply reel 13 and, if not previously coated with flux, is passed through a bath of liquid flux 14 on its way to the assembly point. On leaving the second transverse bending device 10 the tube passes through a first heating device 15, which may take the form of a hot die or a hot roll or rolls. The heating device 15 applies sufficient heat to melt the ribbon of solder and also presses the edge of the outer strip down on to the surface of the inner strip. On leaving the heating device 15 the strip is cooled, preferably with the aid of a forced cooling device 16. After leaving the cooling device 16, which may take the form of a water-cooled die, the tube passes in succession through a second heating device 22 and a second cooling device 24 and then passes round a draw-off capstan 17 and on to a take-up reel (not shown).

The ribbon of solder is preferably guided into position between the two strips at their point of assembly by a channel shaped member 18 (shown in Figure 2) in which it is constrained to run by a bar 19 held by lugs 20 engaging slots in the side walls of the channel member. The bar 19 terminates in a shoe 21 which applies the ribbon 12 to the tube formed by bending the strip 1 and shapes the ribbon to fit the tube and holds it in place until the outer tube formed by the strip 6 has been closed sufficiently to hold it. The shoe 21 may be located in the region of the last but one plate die 11 or between such die and the final die. As will be seen most clearly from Figure 3, the ribbon of solder 12 is so dimensioned and positioned as to bridge the edges of the bent outer strip 6.

If it is required to solder the edges of the inner strip 1 provision will be made to feed in a second ribbon of solder on the diametrically opposite side of the bent inner strip 1 at a point to the rear of the point where the outer strip 6 first meets the inner, that is to say, at a point to the rear of the pulley 9 of the arrangement shown in Figure 1.

The first heater or soldering head 15 is arranged to be operative throughout normal running of the machine and to be automatically rendered inoperative whenever the speed of travel of the tubing passing through it falls below normal or below normal by a pre-determined amount. Suitable means for controlling a heater in this way by operation of a valve or of a switch are disclosed in United States Patents 2,057,582 and 2,064,589, respectively, and suitable means for rendering it inoperative by removing it from the work is disclosed in U. S. Patent 2,064,589. In the event of a stoppage of the machine, due to the momentum of the moving parts of the machine and that of the tube itself, a length of tube will leave the head 15 without the soldering having been effected. On re-starting, due to the inertia of the moving parts of the machine and that of the tube itself, time will be taken to regain normal speed. During this time a further length of tubing will be drawn through the head 15 without becoming soldered. This length and the unsoldered length due to the over-run at a halt are soldered by the second head 22 which on starting up or on re-starting is excited or brought into operation by a trip unit 23 for a short period, preferably as the forward movement of the tubing reaches the normal running speed or a speed approximating thereto. The trip unit may be a timing switch set in operation automatically as the speed of travel of the tube reaches normal, or exceeds a pre-determined minimum value approaching normal and automatically tripped in the event of a stoppage occurring during the time interval for which it has been set. Operation of the time switch in this way may be effected by means such as the centrifugally actuated switch of U. S. Patent 2,064,589. It will be apparent that the aggregate length of tubing leaving the head 15 in an unseamed condition due to a stoppage and to a re-start determine the minimum spacing of the two heads, 15 and 22, and the minimum period of excitation or operation of the second head 22.

It will be understood that in the continuous process according to the invention the finished tube is drawn steadily forward by a capstan 17 or some equivalent draw-off mechanism, causing the strips of metal and the ribbon or ribbons of solder to leave their supply reels and pass continuously through the feeding and shaping members and through the heaters, and also through the coolers when these are provided. The process can be carried out at a high speed and results in an accurately shaped and strong construction of tube in which there can be obtained a continuous soldered seam whether or not the operation of the machine proceeds without temporary stoppage.

It will be appreciated that in some cases it may be unnecessary to employ a flux and that when necessary it may be done by drawing the ribbon of solder through the flux in the manner indicated or by applying flux, as by a brush or roller, to the appropriate parts of the surfaces of the metal strips at some point or points between the supply spools and the heater. Alternatively, the supply reel may be loaded with flux-coated ribbon.

What we claim as our invention is:

1. A process for the production by brazing or soldering of a continuous seam in the wall of a long length of tubing by locally heating each elemental length of tubing to the temperature required to effect the seaming operation, comprising twice heating elemental lengths of tubing to the seaming temperature by passing them through two heating zones in succession, each of which, when it has reached its normal operating temperature and the tubing is running at normal speed, is capable of locally heating the tubing to the seaming temperature, and cooling the elemental lengths after passing them through each heating zone, and adjusting the time between the passage of elemental lengths through the two heating zones by spacing the two heating zones apart by a distance at least equal to the aggregate length of tubing leaving the first zone in an unseamed condition due to a stoppage and to a re-start and return to normal running speed following such stoppage.

2. A process for the production by brazing or soldering of a continuous seam in the wall of a long length of tubing as described in claim 1, in which double heating of the tubing to the seaming temperature is carried on only for an initial period after starting up of the tubing through the heating zones and for an initial period on re-starting after a temporary stoppage of the tubing.

3. Apparatus for the production by brazing or soldering of a continuous seam in the wall of a long length of tubing by a seaming operation effected by raising each elemental length of tubing locally to a required temperature, comprising a pair of heating devices one of which is located an appropriate distance in front of the other, each of which when in full operation is capable of heating the tubing locally to the required seaming temperature as it travels forward at its normal speed of travel, means for cutting off the heat to said heating devices when the tubing falls below its normal speed, and means for bringing both heating devices into action when the tubing reaches a speed approximating to its normal running speed on starting up and on re-starting after a temporary stoppage, the distance between said heating devices being at least equal to the aggregate length of tubing leaving the first zone in an unseamed condition due to a stoppage and to a re-start and return to normal running speed following such stoppage.

4. Apparatus for the production by brazing or soldering of a continuous seam in the wall of a long length of tubing as described in claim 3 and having means for cutting off the heat to the second heating device after an initial period after starting up of the tubing and after an initial period after re-starting after a temporary stoppage of the tubing.

References Cited in the file of this patent

UNITED STATES PATENTS

| | | |
|---|---|---|
| 1,019,043 | Higgin | Mar. 5, 1912 |
| 1,648,921 | Van Huffel | Nov. 15, 1927 |
| 1,685,269 | Bundy | Sept. 25, 1928 |
| 1,893,926 | Anderson | Jan. 10, 1933 |
| 2,024,485 | Sussman | Dec. 17, 1935 |
| 2,089,014 | Bucknam et al. | Aug. 3, 1937 |
| 2,197,191 | Nichols et al. | Apr. 16, 1940 |
| 2,210,338 | Quanstrom | Aug. 6, 1940 |
| 2,234,450 | Quanstrom | Mar. 11, 1941 |